United States Patent [19]
Dickey et al.

[11] Patent Number: 5,990,473
[45] Date of Patent: Nov. 23, 1999

[54] APPARATUS AND METHOD FOR SENSING MOTION IN A MICROELECTRO-MECHANICAL SYSTEM

[75] Inventors: Fred M. Dickey; Scott C. Holswade, both of Albuquerque, N.Mex.

[73] Assignee: Sandia Corporation, Albuquerque, N.Mex.

[21] Appl. No.: 09/018,456

[22] Filed: Feb. 4, 1998

[51] Int. Cl.$^6$ ......................................... G01D 5/34
[52] U.S. Cl. .............................. 250/231.13; 250/231.18; 250/221
[58] Field of Search ........................ 250/231.14, 231.13, 250/231.15, 227.11, 227.14, 227.17, 231.18, 221; 356/373, 375

[56] References Cited

U.S. PATENT DOCUMENTS

| | | | |
|---|---|---|---|
| 3,502,414 | 3/1970 | Kreckel et al. | 250/231.14 |
| 4,746,791 | 5/1988 | Forkel | 250/231.13 |
| 4,806,751 | 2/1989 | Abe et al. | 250/231.13 |
| 4,943,750 | 7/1990 | Howe | 310/309 |
| 5,214,727 | 5/1993 | Carr | 385/22 |
| 5,459,602 | 10/1995 | Sampsell | 359/234 |
| 5,552,925 | 9/1996 | Worley | 359/230 |
| 5,628,917 | 5/1997 | MacDonald | 216/2 |
| 5,631,514 | 5/1997 | Garcia | 310/309 |
| 5,646,928 | 7/1997 | Wu | 369/112 |

OTHER PUBLICATIONS

K. J. Gabriel, F. Behi, R. Mahadevan and M. Mehregany, "In Situ Friction and Wear Measurements in Integrated Polysilicon Mechanisms," *Sensors and Actuators*, vol. A21–A23, pp. 184–188, 1990. (Month unknown).

D. Mathieson, B.J. Robertson, U. Beerschwinger, S.J. Yang, R.L. Reuben, A.J. Addlesee, J. Spencer and R.A. Lawes, "Micro Torque Measurements for a Prototype Turbine," *Journal of Micromechanics and Microengineering*, vol. 4, pp. 129–139, 1994, Jun. 1994.

C. Hudson, "A Guide to Optical Shaft Encoders," *Instruments & Control Systems*, pp. 33–37, May 1978.

P. E. Stephens and G. G. Davies, "New Developments in Optical Shaft–Angle Encoder Design," *The Marconi Review*, vol. 46, pp. 26–42, Jan.–Mar. 1983.

H. Guckel, T.R. Christenson, K.J. Skrobis, J. Klein and M. Karnowsky, "Design and Testing of Planar Magnetic Micromotors Fabricated by Deep X–Ray Lithography and Electroplating," *Proceedings of Transducers '93*, pp. 76–79, 1993. (Month unknown).

E.J. Garcia and J.J. Sniegowski, "Surface Micromachined Microengine," *Sensors and Actuators A*, vol. 48, pp. 203–214 (1995), Feb. 1995.

P.R. Nelson, P.B. Chu, and K.S.J. Pister, "Optical Methods for Characterization of MEMS Device Motion," *Proceedings of SPIE*, vol. 2640, pp. 53–57, Nov. 1995.

S.L. Miller, J.J. Sniegowski, G.LaVigne and P.J. McWhorter,"Friction in Surface Micromachined Microengines," *Proceedings of SPIE*, vol. 2722, pp 197–204, Feb. 28, 1996.

(List continued on next page.)

*Primary Examiner*—Que T. Le
*Attorney, Agent, or Firm*—John P. Hohimer

[57] ABSTRACT

An apparatus and method are disclosed for optically sensing motion in a microelectromechanical system (also termed a MEMS device) formed by surface micromachining or LIGA. The apparatus operates by reflecting or scattering a light beam off a corrugated surface (e.g. gear teeth or a reference feature) of a moveable member (e.g. a gear, rack or linkage) within the MEMS device and detecting the reflected or scattered light. The apparatus can be used to characterize a MEMS device, measuring one or more performance characteristic such as spring and damping coefficients, torque and friction, or uniformity of motion of the moveable member. The apparatus can also be used to determine the direction and extent of motion of the moveable member; or to determine a particular mechanical state that a MEMS device is in. Finally, the apparatus and method can be used for providing feedback to the MEMS device to improve performance and reliability.

55 Claims, 5 Drawing Sheets

OTHER PUBLICATIONS

W.R. Cox, T. Chen, D.J. Hayes, R.F. Hoenigman and D.L. MacFarlane, "Microjet Printing of Micro–Optical Waveguides," *Proceedings of the IEEE Lasers and Electro–Optics Society* (LEOS), pp. 40–41, Nov. 20, 1996.

P. Ruther, W. Bacher, K. Feit and W. Menz, "LIGA–Microtesting System with Integrated Strain Gauges for Force Measurement," Proceedings of the 10th IEEE MEMS Workshop, pp. 541–545, 1997. (Month unknown).

F.M. Dickey, S.C. Holswade, N.F. Smith and S.L. Miller, "An Optical Probe for Micromachine Performance Analysis," *Proceedings of SPIE*, vol. 3008, pp. 52–61, Feb. 10, 1997.

L.A. Hornak, K.S. Brown, B.J. Taylor and J.C. Barr, "Polymer Guided Wave Integrated Optics: An Enabling Technology for Micro–Opto–Electro–Mechanical Systems," *Proceedings of SPIE*, vol. 3008, pp. 124–135, Feb. 10, 1997.

M.–H. Kiang, J.T. Nee, K.Y. Lau and R.S. Muller, "Surface–Micromachined Diffraction Gratings for Scanning Spectroscopic Applications," *Proceedings of the International Conference on Solid–State Sensors and Actuators* (Transducers '97), pp. 343–345, Jun. 16, 1997.

H. Miyajima, E. Yamamoto and K. Yanagisawa, "Optical Micro Encoder Using A Twin–Beam VCSEL with Integrated Microlenses," *Proceedings of the International Conference on Solid–State Sensors and Actuators* (Transducers '97), pp. 1233–1236, Jun. 16, 1997.

A. Mittas, F.M. Dickey and S.C. Holswade, "Modeling an Optical Micromachine Probe," *Proceedings of SPIE*, vol. 3173, pp. 345–356, Jul. 28, 1997.

S.C. Holswade and F.M. Dickey, "Optical Measurement of Micromachine Engine Performance," *Proceedings of SPIE*, vol. 3224, pp. 131–140, Sep. 29, 1997.

F.M. Dickey, S.C. Holswade, T.R. Christenson, E.J. Garcia and M.A. Polosky, "Optical Measurement of LIGA Milliengine Performance," Presented at the SPIE Miniaturized Systems with Micro–Optics and Micromechanics III Conference, San Jose, CA, Jan. 26–27, 1998.

K.S. Brown, B.J. Taylor, J.M. Dawson and L.A. Hornak, "Polymer Waveguide Co–Integration with Microelectromechanical Systems (MEMS) for Integrated Optical Metrology," Presented at the SPIE Miniaturized Systems with Micro–Optics and Micromechanics III Conference, San Jose, CA, Jan. 26–27, 1998.

A.T.T.D. Tran, J. J. Lee, K. Zhang, and Y.–H. Lo, "Ultrafine Motion Detection of Micromechanical Structures Using Optical Moire Patterns," IEEE Photonics Technology Letter, vol. 8, No. 8, Aug. 1996.

APPARATUS AND METHOD FOR SENSING MOTION IN A MICROELECTRO-MECHANICAL SYSTEM

GOVERNMENT RIGHTS

This invention was made with Government support under Contract No. DE-AC04-94AL85000 awarded by the U.S. Department of Energy. The Government has certain rights in the invention.

FIELD OF THE INVENTION

The present invention relates generally to microelectromechanical systems (MEMS), and particularly to optical apparatus and methods for sensing the movement of moveable members such as gears within a MEMS device.

BACKGROUND OF THE INVENTION

Microelectromechanical systems (MEMS) are machines fabricated on a microscopic scale using surface micromachining or LIGA processes. MEMS devices can include moveable members (e.g. gears, rotors, linkages, levers, hinges and mirrors) for applications including sensing (e.g. acceleration or chemicals), switching (electrical or optical signals) and optical display (e.g. moveable mirrors) functions. MEMS devices can further include actuators or motors for driving gear trains to perform various functions including coded locks and self-assembling structures.

A particular problem in the development of MEMS devices is sensing the movement of particular members or elements within the device, for example, to determine a mechanical state of the device. In many types of MEMS devices (e.g. accelerometers), capacitive sensing using one electrode on the moveable member and another electrode on the substrate is adequate to measure movement of the members. However, in many other types of MEMS devices, capacitive sensing is difficult to implement, either due to problems of making electrical connections to the moveable members (e.g. a gear rotating on a hub), due to overlapping members (e.g. meshed gears), or due simply to a small size of the moveable members which limits the amount of capacitance and thereby presents signal-to-noise problems. As MEMS devices become increasingly complicated, the need for adequate sensing of movement becomes important.

An advantage of the apparatus and method of the present invention for optically sensing motion in a microelectromechanical system is that the light used to sense the motion of a moveable member does not perturb the motion of the member.

Another advantage of the apparatus and method of the present invention is that a direction or an extent of movement can be sensed.

A further advantage is that a particular mechanical state of a microelectromechanical system can be ascertained.

Yet another advantage of the present invention is that a performance characteristic (e.g. a uniformity of motion, a spring coefficient, a damping coefficient, torque supplied by a driving member, or friction of a driven member) of a microelectromechanical system can be determined.

Still another advantage of the present invention is that the apparatus and method can be used to collect information to assess failure mechanisms or reliability of a microelectromechanical system.

Yet a further advantage is that a feedback loop can be implemented using the apparatus and method of the present invention to measure a performance characteristic of the microelectromechanical system and to provide corrective feedback to the system, thereby improving operation and reliability therein.

These and other advantages of the method of the present invention will become evident to those skilled in the art.

SUMMARY OF THE INVENTION

The present invention relates to an optical apparatus for sensing motion of a moveable member such as a gear, rack, linkage or a gear-driven structure in a microelectromechanical system (also termed herein a MEMS device). The apparatus comprises a light source located proximate to the MEMS device for generating light and directing the light to intercept a corrugated portion of the moveable member; and a light detector located proximate to the microelectromechanical system for detecting a portion of the light reflected or scattered from the corrugated portion of the moveable member, thereby sensing the motion of the moveable member within the microelectromechanical system. The light source can be a laser, a light-emitting diode (LED) or an incandescent lamp; and can further include an optical fiber or an optical waveguide for conveying the light to the moveable member, and a lens for focusing the light to a spot size smaller than the size of the moveable member, and preferably smaller than a periodicity of the corrugated portion of the moveable member. The light detector can further include one or more lenses, optical fibers or optical waveguides for collecting the reflected or scattered light for detection thereof.

In some embodiments of the present invention, the corrugated portion of the moveable member can comprise gear teeth; whereas in other embodiments of the present invention, the corrugated portion can comprise one or more features recessed into a surface or edge of the moveable member, or protruding outward therefrom. Additionally, embodiments of the present invention can be formed with the corrugated portion of the moveable member shaped to form an optical encoder for encoding the positional information about moveable member. Finally, embodiments of the present invention can be formed with the corrugated portion of the moveable member shaped to increase the reflected or scattered light in a particular direction.

Generally, the MEMS device will include a motor for driving the moveable member. The motor can comprise one or more linear actuators acting in combination with the moveable member (e.g. a pair of phased linear actuators mechanically coupled to a gear). In a surface micromachined MEMS device, the motor can be an electrostatic motor; whereas in a MEMS device formed by LIGA (an acronym based on the first letters for the German words for lithography and electroplating) the motor can be an electromagnetic motor.

According to the present invention, the types of information that can be recovered about the MEMS device can include information about a direction of movement of one or more moveable members, or information about an extent or range of movement of the moveable members. The recovered information can be used to determine a mechanical state of the microelectromechanical system. Additionally, the recovered information can be used for assessing a performance characteristic of the MEMS device such as a uniformity of motion of the moveable member; spring and damping coefficients within the microelectromechanical system; or torque and friction within the microelectromechanical system. Furthermore, the recovered information can be used to assess failure mechanisms or reliability of the microelectromechanical system. Finally, the recovered information can be used to generate an electrical feedback signal which can be provided to an input of the MEMS device for controlling the MEMS device, thereby improving performance and/or reliability of the device.

The method of the present invention for analyzing performance of a microelectromechanical system (i.e. a MEMS device) comprises steps for directing light from a source to intercept a corrugated portion of a moveable member of the MEMS device, and reflecting or scattering a portion of the light from the corrugated portion of the moveable member; and detecting the reflected or scattered portion of the light, and recovering information therefrom about a performance characteristic of the MEMS device.

The step for directing the light to intercept the corrugated portion of the moveable member can comprise directing the light through an optical fiber or an optical waveguide, and/or focusing the light with a lens. The step for detecting the reflected or scattered portion of the light can comprise collecting the light with one or more lenses, optical fibers or optical waveguides. The collected light can be either forward-scattered light, or back-scattered light or both. Additionally, the step for detecting the reflected or scattered portion of the light can comprise measuring a frequency shift in the light, measuring a polarization characteristic of the light, or measuring a coherence characteristic of the light.

The method can be used to obtain performance information about a direction, extent or uniformity of motion of one or more moveable members within a MEMS device; information about a mechanical state of the MEMS device; information associated with motion within the MEMS device (e.g. spring and damping coefficients, or torque and friction). The method can further include a step for assessing the reliability of the MEMS device based on the information recovered about one or more performance characteristics of the MEMS device. Additionally, the method of the present invention can include steps for generating an electrical feedback signal from the recovered information about the performance characteristic of the MEMS device, and providing the electrical feedback signal directly or indirectly to an input of the MEMS device, thereby improving performance or reliability of the device.

Additional advantages and novel features of the invention will become apparent to those skilled in the art upon examination of the following detailed description thereof when considered in conjunction with the accompanying drawings. The advantages of the invention can be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several aspects of the present invention and, together with the description, serve to explain the principles of the invention. The drawings are only for the purpose of illustrating preferred embodiments of the invention and are not to be construed as limiting the invention. In the drawings.

DETAILED DESCRIPTION OF THE INVENTION

Figure 1:
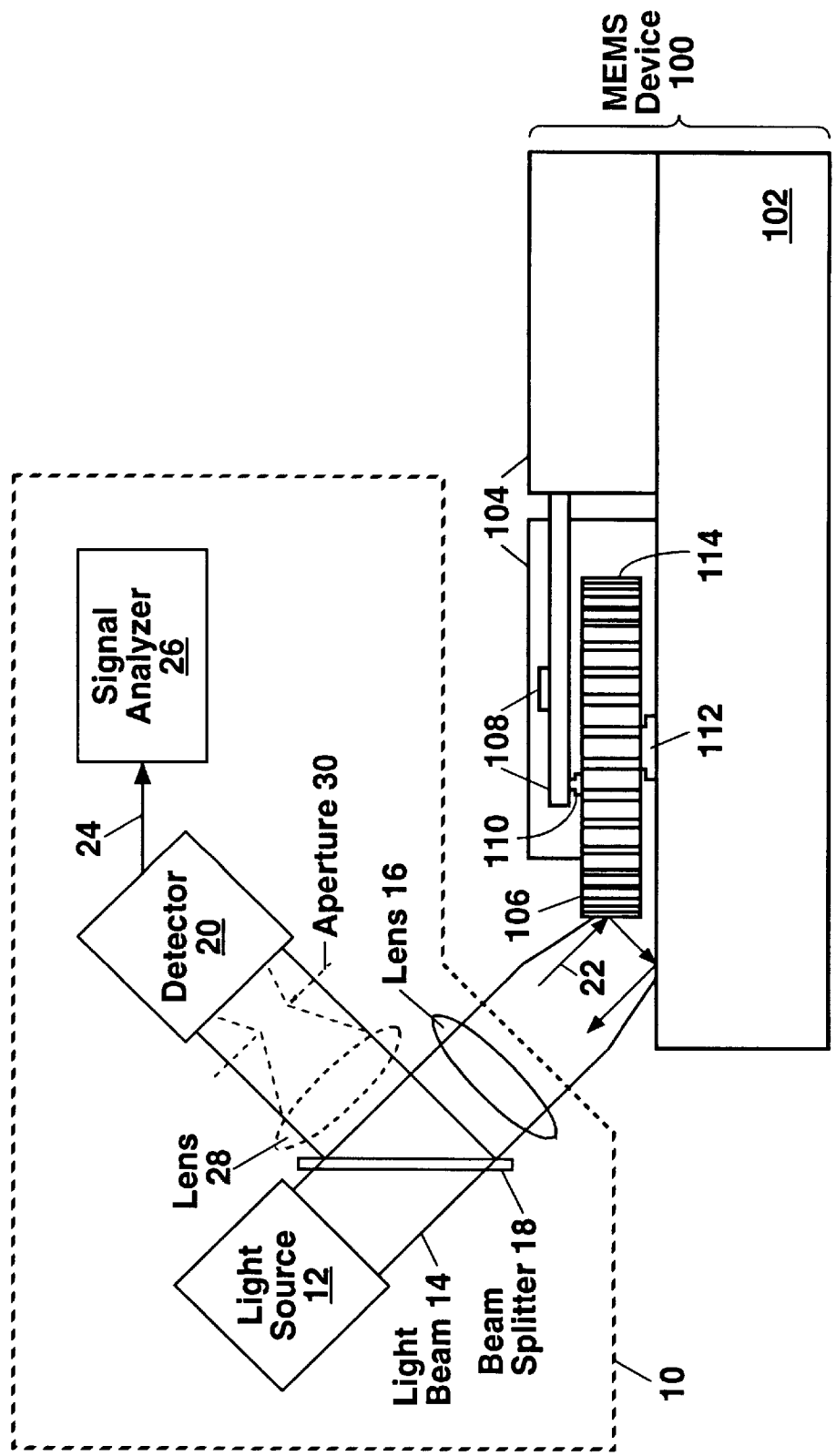
FIG. 1 shows a schematic representation of a first embodiment of the present invention.

Referring to FIG. 1, there is shown schematically a first embodiment of the present invention. The first embodiment of the present invention has particular applications for qualification testing of a MEMS device 100 (i.e. a microelectromechanical system) by providing a way for optically determining performance characteristics of the MEMS device 100, including information about a direction, extent or uniformity of motion of a moveable member (e.g. a gear); information about spring and damping coefficients of one or more members within the MEMS device; information about torque and friction (including stiction) associated with one or more moveable members within the MEMS device; or information about reliability of the MEMS device (e.g. life testing, failure analysis, or measurements of a rate of change in a particular performance characteristic in an operating MEMS device over time).

In the first embodiment of the present invention in FIG. 1, the optical apparatus 10 is located external to the MEMS device 100, and can be used to gather information about performance of the MEMS device 100 without adversely affecting operation of the MEMS device. The MEMS device 100 to be analyzed by the apparatus 10 generally comprises a substrate 102 upon which a motor is fabricated by surface micromachining or LIGA processes. A particular type of motor with which the apparatus and method of the present invention can be used is shown in FIG. 1 and comprises a pair of phased linear actuators 104 (e.g. electrostatic comb-drive actuators) fabricated on the substrate 102 at right angles to each other to drive a gear 106 by coupled linkages 108 (see also FIG. 3). This type of motor is described in U.S. Pat. No. 5,631,514 to Garcia et al, which is incorporated herein by reference. Linear motion of the pair of phased linear actuators 104 is converted into rotational motion of the gear 106 by the linkages 108, one of which is coupled to the gear 106 by a pin joint or coupling 110 located at a predetermined radius from a hub 112 on which the gear 106 is mounted. The motor driven gear 106 can be operatively connected to drive additional gears (not shown in FIG. 1), to accomplish particular mechanical functions, including forming coded locks or self-assembled structures.

An optical position measurement of one or more moveable members such as gear 106 is advantageous due to a small size of the moveable members (which can range from about 50 microns to a few millimeters in diameter with thicknesses from a few microns to about 0.5 millimeter), and also due to rapid motion of the moveable members which have been shown to exceed 300,000 rpm for an electrostatically-driven 50 $\mu$m-diameter gear 106. Additionally, the optical apparatus and method of the present invention provides flexibility for analyzing many different types of moveable members within a MEMS device 100, including members that provide both rotary and linear motion. Finally, the optical apparatus and method of the present invention offers flexibility for making both transient and long-term response measurements in order to analyze one or more performance characteristics of the MEMS device 100.

In FIG. 1, the first embodiment of the present invention comprises a light source 12 which is generally a laser (e.g. a helium-neon laser or a semiconductor diode laser) or a light-emitting diode (LED), although an incandescent lamp can also be used. Light in the form of a beam 14 is provided by the source 12 and is directed to intercept the moveable member (i.e. gear 106) at the location of a corrugated portion thereof (indicated in FIG. 1 as gear teeth 114). A lens 16, as shown in FIG. 1, can be used to focus the light to a spot size that is smaller than the size of the moveable member, and generally about the periodicity of the corrugated portion or less.

In FIG. 1, the corrugated portion comprises a plurality of teeth 114 formed around the edge of the gear 106. The gear teeth 114 reflect or scatter a portion of the incident light which can be collected by lens 16 and directed by way of a partially-reflecting beamsplitter 18 to detector 20. This can be understood with reference to light ray 22 which is initially directed to intercept the gear teeth 114. Surfaces of the gear teeth 114 reflect or scatter the light ray 22 downward towards the upper surface of substrate 102 which can further reflect or scatter the ray 22 back toward lens 16 and to the detector 20 which produces an electrical output signal 24 from the detected light. Multiple reflecting surfaces on the gear 106 in combination with the surface of the substrate 102 can form a corner reflector for efficiently redirecting the reflected or scattered light back to detector 20.

In FIG. 1, detector 20 can be, for example, a semiconductor detector (e.g. a silicon photodetector) or a photomultiplier tube (PMT) having a response characteristic that is matched to the particular type of light source 12 that is used. A detection bandwidth of the detector 20 will in general depend upon a rate of motion of the moveable member being analyzed, the periodicity of the corrugated portion therein, and the temporal resolution desired. Suitable detection bandwidths for detector 20 can range from a few kiloHertz (kHz) up to a few gigaHertz (GHz). Additionally, detector 20 can include a signal amplifier for increasing the size of the detector output signal 24. The electrical output signal 24 can be analyzed with a signal analyzer 26 which can be, for example, a discriminator, a pulse counter, a transient digitizer, an oscilloscope, a computer or the like.

Additional light rays (not shown in FIG. 1) can travel in the opposite direction of ray 22 by first being reflected or scattered from the upper surface of the substrate 102 and then being reflected or scattered off one or more surfaces of the gear teeth 114 before being collected by lens 16. Generally, the reflected or scattered light will depend strongly on the geometry of each scattering object and on the orientation of light beam 14 relative to gear 106. A strong detected light signal can be obtained when the reflectances of the various surfaces of the scattering objects (e.g. gear 106 and substrate 102) are approximately equal (e.g. in the case of a silicon substrate 102 and a polysilicon gear 106).

To improve a signal-to-noise ratio of the detector output signal 24 and discriminate against background light, an optional second lens 28 and limiting aperture 30 (indicated by dashed lines in FIG. 1) can be placed in front of detector 20 to form a confocal optical system that spatially filters the reflected or scattered light (also indicated by dashed lines in FIG. 1). Such a confocal optical system is advantageous for improving a contrast in the detected light signal and also in discriminating against light scattered from surfaces other than the corrugated portion of the moveable member. Use of a confocal optical system in the apparatus 10 is most effective when the light beam 14 is focused to a small spot to illuminate only a single gear tooth 114.

Movement of the gear teeth 114 during rotation of the gear 106 can result in a modulation of the reflected or scattered portion of the light, especially when the incident light beam 14 intercepts only a small number of teeth 114, or a single tooth 114. This modulation of the reflected or scattered light encodes positional information onto the detected light which can be recovered from the detector output signal 24, thereby allowing a measurement of a performance characteristic of the MEMS device 100.

As the term is used herein, a performance characteristic can include any type of information about the MEMS device 100 which can be recovered from a transient or long-term measurement of the movement of one or more moveable members of the MEMS device 100. Thus, the term "performance characteristic" as defined herein includes, but is not limited to, information about a direction of movement of a moveable member (e.g. forward or backward, clockwise or counterclockwise); information about an extent of movement of the moveable member (e.g. where in a range of movement of the moveable member that the moveable member is located at a particular instant of time); information about a uniformity of motion of the moveable member (e.g. whether the member is moving continuously or discontinuously; and at what rate or speed the member is moving); information about a mechanical state of the MEMS device 100 (e.g. an "open" state, or a "locked" state; an enabled state, or a disabled state; or which of a plurality of possible mechanical states the MEMS device 100 is in at a particular instant of time); information associated with motion within the MEMS device (e.g. a spring coefficient, a damping coefficient, or torque supplied by a driving member; or friction due to mechanical interference in a driven member); and reliability information for assessing a quality or lifetime of the MEMS device 100.

As an example, to analyze the motion of gear 106 in FIG. 1 with the apparatus 10, measurements can be made of the following performance characteristics that are associated with rotation of the gear 106: (1) rotation rate or angular velocity, and a direction (clockwise or counterclockwise) of rotation of the gear 106; (2) fluctuations in the rotation rate or angular velocity within a single rotation of the gear 106, or over time during multiple rotations of the gear 106; and (3) phase of the gear motion relative to a reference signal (e.g. a voltage drive signal applied to one of the electrostatic actuators 104), and a variation in the phase of the gear motion as a function of a frequency of the reference signal. Additional information such as a starting position of the gear 106, or a reference position provided on the gear 106 and ascertained by the apparatus 10 can be useful to determine the position of the gear 106, or of a gear-driven structure (e.g. a coded lock, pin-in-maze assembly, optical shutter, pop-up mirror or other MEMS structure). Such a determination of the position or one or more moveable members in a MEMS device 100 can be used for timing during operation of the MEMS device 100. Additionally, the position of the moveable member(s) can be used to determine a mechanical state of the MEMS device 100, or to identify which of a two or more mechanical states a particular MEMS device 100 is in at a particular point in time.

Figure 5A:
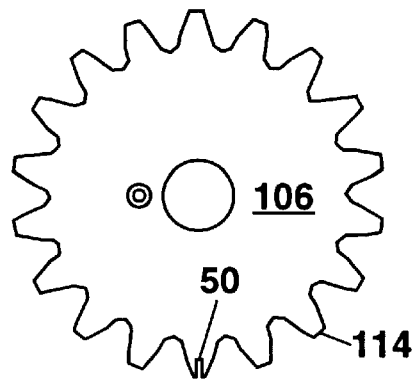
FIGS. 5a–5d show examples of features that can be provided on a moveable member within a MEMS device to form a positional reference, or to measure movement of the member with the apparatus of the present invention.

In the above example, the measurement of the rotation rate and fluctuations in the rotation rate can be made by counting electrical pulses generated in the detector 20 in response to pulses in the reflected or scattered light that are produced as the gear teeth 114 pass through the focused light beam 14 in FIG. 1. If the light beam 14 is focused to a spot size equal to or smaller than one of the gear teeth 114, the rotation rate can be determined simply by dividing the number of counted electrical pulses per unit time by the number of teeth 114 on the gear 106. If the light beam 14 is focused to a spot size that illuminates a small number of gear teeth 114, the detected light signal can still have a signal modulation component due to the passage of the gear teeth 114 through the light beam 14 so that information about rotation of the gear 106 can generally still be recovered. Finally, if the light beam illuminates many gear teeth 114, at least one of the gear teeth 114 can be shaped (e.g. to slant an outer surface of the gear tooth at a predetermined angle, or to provide one or more of the gear teeth 114 with a reference feature therein as shown in FIG. 5a) to increase or decrease the reflected or scattered light as compared to the remaining teeth 114, thereby allowing the detected light signal to recover information about rotation of the gear 106.

The apparatus and method of the present invention can also be used to measure a direction of movement of one or more moveable members within the MEMS device 100. In the example of gear 106 in FIG. 1, a direction of rotation of the gear 106 can generally be determined from the shape of the detector output signal 24 as each gear tooth 114 passes through the illuminating light beam 14 since the reflected or scattered light is generally not symmetric with respect to a reference point on a gear tooth 114.

In the event that the detector output signal 24 is symmetric, an asymmetry can be introduced into the light beam 14 by shaping the beam 14 so that the light intensity varies across the beam 14 (e.g. by inserting a linearly varying or stepped attenuation filter into the light beam 14 near light source 12). As each gear tooth 114 moves across the non-uniform illumination provided by the filtered light beam 14, the amount of reflected or scattered light that is detected will depend on which side of the light beam 14 that the gear tooth 114 encounters first (i.e. on whether the gear tooth 114 first encounters a brightly-illuminated side of the incident light beam 14, or a dimly-illuminated side of beam 14). By observing the temporal variation of the detected light as each gear tooth 114 passes through the illuminating beam 14, the direction of rotation of the gear 106 can be ascertained. Instead of inserting a filter into light beam 14, a polarizer can be inserted into one side of an unpolarized light beam 14, with a similarly-oriented or crossed polarizer inserted in front of detector 20.

Other methods for measuring a direction of movement of a moveable member will become evident to those practicing the present invention. For example, a pair of detectors 20 can be used to simultaneously detect forward- and back-scattered light components and the phase between these two components to provide additional phase information to determine the direction of movement of the moveable member (e.g. gear 106). Alternately, a pair of light beams 14 can be overlapped at the position of the moveable member to provide an interference pattern of non-uniform illumination; and the reflected or scattered light from the non-uniform illumination can be detected and used to determine the direction of movement of the moveable member (e.g. the direction of rotation of gear 106). As another example, the light beams 14 in the pair can each be focused to separate spots spaced by a predetermined distance (generally less than a spacing between adjacent gear teeth 114) so that the phase between the detected light signals can provide information about the direction of rotation of gear 106. Finally, a single-frequency light source 12 such as a single-frequency semiconductor diode laser can be used in the apparatus 10 of FIG. 1; and a measurement of a Doppler frequency shift in the light reflected or scattered from a moving gear 106 can be used to provide an indication of the direction of rotation of the gear 106. The Doppler frequency shift can be measured by heterodyning the reflected or scattered light with a portion of the incident light beam 14 in the detector 20 to generate an alternating-current (a.c.) component of the electrical output signal 24 at a frequency that is equal to the difference in optical frequencies of the incident light beam 14 and the reflected or scattered light.

In order to measure a performance characteristic of the MEMS device 100 such as a spring constant or coefficient of an electrostatic actuator 104, an electrostatic force constant of the actuator 104 or a damping coefficient of the actuator 104, the apparatus 10 can be used to make measurements of the driven gear 106 in response to various voltage drive signals, V, applied to the electrostatic actuators 104. In FIG. 1, rotation of the gear 106 is effected by providing voltage drive signals to the electrostatic actuators 104 that are 90° out of phase so that each actuator 104 is alternately driven through a range of forward or backward motion, thereby rotating the gear 106 discontinuously in substantially 90° increments.

Spring and damping coefficients of each of the electrostatic actuators 104 can be measured in turn with the apparatus 10 using a transient measurement method whereby a voltage drive signal is applied to one of the actuators 104 to rotate the gear 106 by 90° and then suddenly removing the voltage drive signal, thereby allowing the actuator 104 to be released and spring back towards a rest position. By measuring a transient response of motion of the gear 106 when the actuator 104 is released, and fitting the transient response to a step-function response of a homogeneous differential equation describing a damped oscillator, the spring and damping coefficients of the electrostatic actuator 104 can be calculated.

An improved and preferred method for measuring the spring and damping coefficients is set forth herebelow, based on a swept frequency response measurement and fitting to the inhomogeneous oscillator equation:

$$m\frac{d^2x}{dt^2} + c\frac{dx}{dt} + kx = aV_0^2 e^{i\omega t}$$

where k is the spring constant, c is the damping coefficient, and a is a proportionality constant relating force of the electrostatic actuator 104 and voltage drive signal, V. By dividing the above equation by mass, m, the above equation can be put into a standard form:

$$\frac{d^2x}{dt^2} + 2\zeta\omega_0\frac{dx}{dt} + \omega_0^2 x = \alpha V_0^2 e^{i\omega t}$$

where the coefficients are defined by their positions in the equation, and $\xi = c/c_c$ with $c_c$ being the damping coefficient corresponding to critical damping. A voltage drive signal given by $V = V_0(\sin \omega t)^{0.5}$ is used to obtain a sinusoidal driving force for the electrostatic actuator 104.

The steady state (particular) solution of the standard-form equation above is given by:

$$x(t) = \frac{\gamma V_0^2}{-\omega^2 + i\omega 2\zeta\omega_0 + \omega_0^2} e^{i\omega t} = A(\omega)e^{i\{\omega t + \phi(\omega)\}}$$

and the phase φ is given by:

$$\phi(\omega) = \arctan\left(\frac{-\omega\zeta\omega_0}{-\omega^2 + \omega_0^2}\right).$$

The following phase relations are satisfied by the solution: φ=0, ω→0; φ=−π/2, ω=ω$_0$; and φ=π, ω→∞. These three phase relations are sufficient to determine the damping coefficient, c, and spring constant, k, given the mass, m of the electrostatic actuator 104 which can be estimated from dimensions thereof.

However, a two parameter fit of experimentally measured data with the apparatus 10 to the phase function, φ(ω), provides a better estimation of the damping coefficient, c, and spring constant, k. Since the phase, φ, is a continuous function of frequency, ω, the phase can be measured by observing a delay between the drive voltage, V, and one of the pulses of light produced by the light being reflected or scattered from a gear tooth 114 as the gear is oscillated back and forth over a small angle (i.e. a small value of the voltage drive signal, V, is provided to only one actuator 104 to cause the gear 106 to oscillate about a small angle without any rotation of the gear 106). The measurement with the apparatus 10 can consist of tracking the position in time of one the electrical pulses in electrical output signal 24 generated by the detector 20 in response to reflected or scattered light from a small number of gear teeth 114, with that electrical pulse being selected to occur during a cycle or period of the voltage drive signal, V, applied to the electrostatic actuator 104 at each drive frequency, ω, used for estimating the phase function, φ(ω). Since the amplitude of oscillation of gear 106 generally changes with the drive frequency, ω, one must be careful to maintain tracking of the same electrical pulse corresponding to the light reflected or scattered from a particular gear tooth 114. However, this is easily accomplished since the phase is a continuous function of the drive frequency, ω.

It should also be noted that the phase measurement is continuous and not sampled. That is, the phase, φ, is determined by tracking a shift in position of the same electrical output pulse during successive cycles of the voltage drive signal, V; and the phase resolution is determined by an ability to perform peak or leading edge detection of the electrical output pulse. This swept frequency response measurement method can also be applied to small-signal (i.e. small displacement) excitation of the MEMS device 100.

The swept frequency response measurement method compares favorably with the transient measurement method described heretofore, while allowing a more rapid collection of measurement data since the data stream is one dimensional. Additionally, by measuring each rotation of the gear 106, the swept frequency response measurement method provides statistical information for the spring and damping coefficients. This statistical information would take much more time to obtain using the transient measurement method. Finally, the swept frequency response measurement method has an advantage of allowing the actuator 104 to operate in a region where its motion is substantially linear (i.e. a region wherein the excursion of the drive spring within actuator 104 is small).

Real-time position measurements can also be instrumental in identifying fundamental degradation and failure mechanisms associated with a particular MEMS device 100. For example, a mechanical interference between gear 106 and hub 112 (e.g. due by the presence of dust or stringers, irregularities, or tight tolerances between the members) can be identified by measuring the rotation rate or uniformity of rotation of gear 106 with the apparatus 10. Similarly mechanical interferences between other moveable members (e.g. meshed gears within a gear train, a gear-driven rack, or a gear-driven structure) can be identified; and their effects on operation of the MEMS device 100 can be analyzed by using the apparatus 10 of the present invention to measure the motion of one or more of the moveable members. Long-term reliability of the MEMS device 100 is expected to depend in part on an initial smoothness of rotation of one or more moveable members (e.g. gear 106).

Additionally, time-dependent position measurements can be used to determine the torque supplied by electrostatic actuators 104 under particular drive conditions (i.e. particular values or frequencies of the voltage drive signals), and information about the friction presented by one or more moveable members under various load conditions. Real-time position measurements are particularly important when movement of one or more moveable members of the MEMS device 100 are non-periodic (e.g. due to positional fluctuations during movement of the members). Conventional optical measurement methods such as high-resolution video microscopy or stroboscopy, which rely on periodic motion, are virtually useless for measuring non-periodic motion or positional fluctuations.

Figure 2:
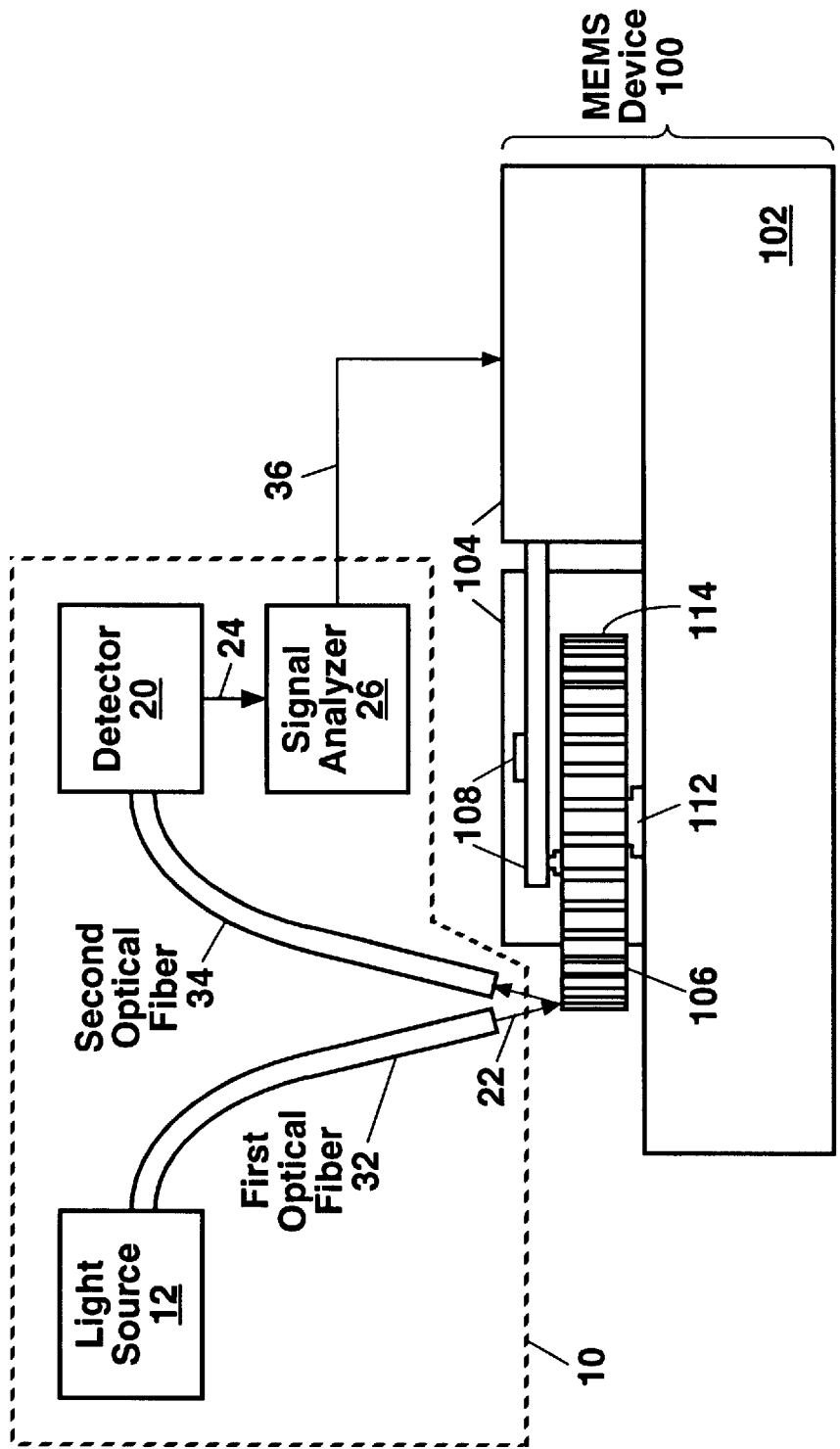
FIG. 2 shows a schematic representation of a second embodiment of the present invention.

Other embodiments of the apparatus 10 of the present invention are possible that allow the reflected or scattered light to be collected directly without depending upon a reflection from the upper surface of the substrate 102 as shown in FIG. 1. FIG. 2 shows a second embodiment of the present invention in which the reflected or scattered light is measured at an angle to the incident light. In this second embodiment of the present invention, light from source 12 is directed through a first optical fiber 32 so that light rays 22 intercept a corrugated portion (e.g. gear teeth 114) of a moveable member (e.g. gear 106) within a MEMS device 100. The light that is reflected or scattered from the corrugated portion is collected by a second optical fiber 34 and directed to detector 20 for generation of an electrical output signal 24. In the second embodiment of the present invention, the optical fibers, 32 and 34, can have lenses formed at their ends proximate to gear 106 (e.g. the fibers can be lensed fibers); or a separate lens (not shown) can be located between one or both of the fibers, 32 and 34, and the gear 106 or other moveable member of the MEMS device 100.

As an example, the second embodiment of the present invention can use a helium-neon (He-Ne) laser light source 12 with single-mode first optical fiber 32 having a 5-μm-diameter core. The second optical fiber 34 can be a multi-mode fiber having a core diameter of up to about 1 millimeter. A microscope and probe stage (not shown) can be used for visual observation and alignment of the optical fibers, 32 and 34, with micromanipulators. Furthermore, the optical fibers, 32 and 34, can be mounted in a common fixture so that the fiber ends nearest the MEMS device 100 are maintained in relative alignment, thereby allowing a single micromanipulator to be used for aligning the optical fibers, 32 and 34, to gear 106. Additionally, for testing a plurality of MEMS devices 100, the apparatus 10 can be used with an automated alignment system based on computer image recognition (i.e. machine vision) for precisely and quickly positioning the optical fibers, 32 and 34, at the location of one or more moveable members within each MEMS device 100 being tested.

In FIG. 2, the signal analyzer 26 is shown operating in an optional feedback loop configuration wherein an electrical feedback signal 36 is provided to an electrical input (i.e. a voltage drive signal input) of the MEMS device 100 for use in improving one or more performance characteristics thereof. As an example, information about the uniformity of motion of gear 106 in FIG. 2 can be obtained with the apparatus 10 and used to generate the electrical feedback signal 36 for altering a voltage drive signal to the MEMS device 100, thereby improving the uniformity of motion of gear 106. As another example, information about the mechanical state of a MEMS device 100 can be determined with the apparatus 10 and fed back to the MEMS device 100 to reverse a direction of rotation of gear 106 when a predetermined limit of motion of the gear 106 (or a gear-driven structure) is reached.

Real-time feedback is advantageous for enabling the voltage drive signal(s) to be altered to respond to changing load conditions within the MEMS device 100, or to maintain an optimum operation condition for the device. Additionally, feedback control can be use to reduce variations in contact forces between the gear 106 and hub 112 as the gear 106 is rotated. If not corrected through feedback control, such forces can result in wear at the gear/hub interface that can degrade the lifetime and reliability of the MEMS device 100.

Figure 3:
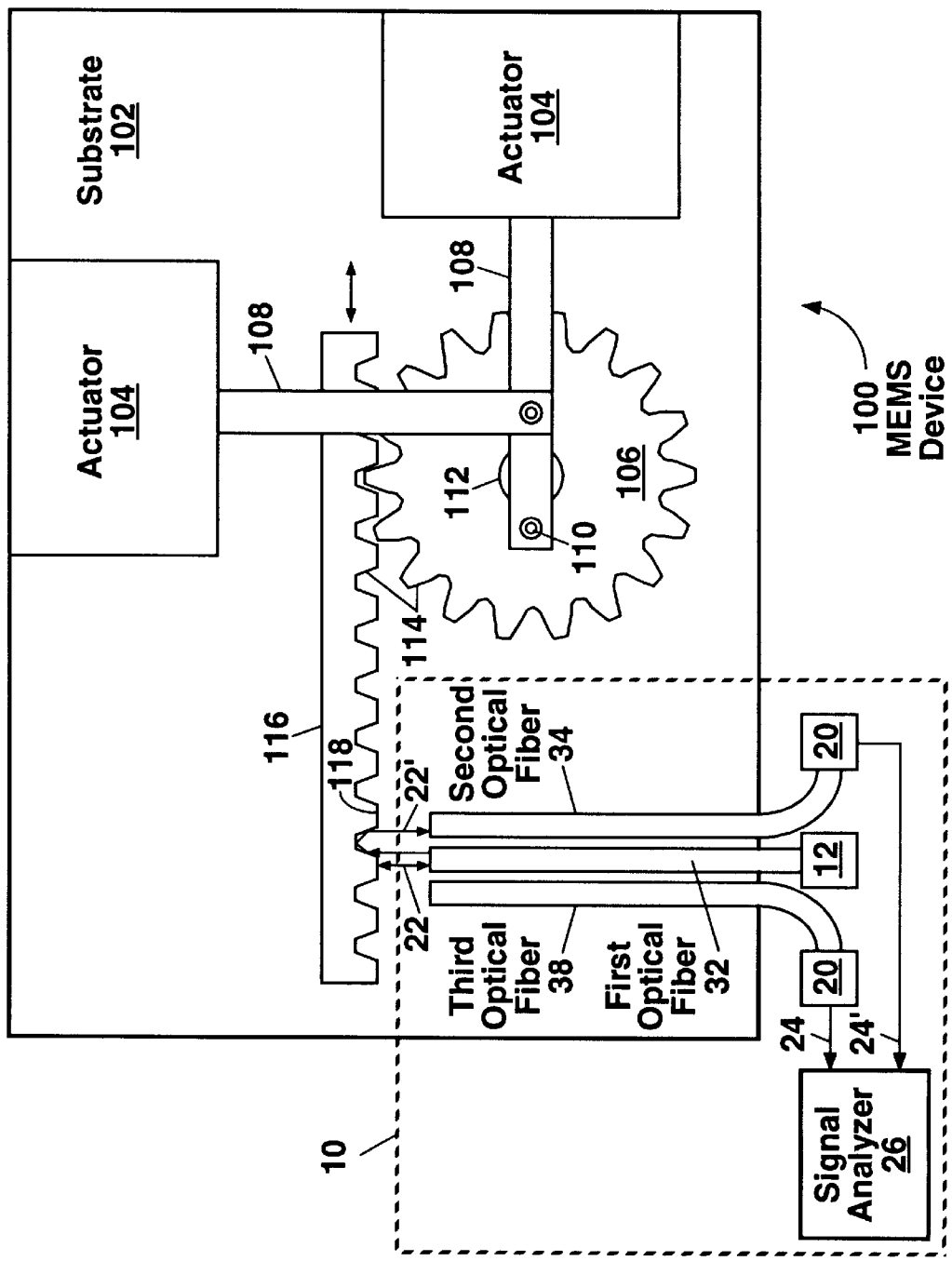
FIG. 3 shows a schematic representation of a third embodiment of the present invention.

FIG. 3 shows a third embodiment of the present invention. In FIG. 3, the MEMS device 100 comprises a motor formed by a pair of electrostatic actuators 104 driving a gear 106 through coupled linkages 108 and pin joint 110. Rotary motion of gear 106 can be converted into linear movement (i.e. displacement) by a rack 116 (defined herein as a linear gear comprising a plurality of spaced gear teeth) as shown in FIG. 3. For simplicity, pins or bearing surfaces and limit stops for constraining movement of the rack 116 are not shown in FIG. 3.

Linear movement of the rack 116 can be sensed by the third embodiment of the apparatus 10 which comprises a first optical fiber 32 for providing light from source 12 to intercept gear teeth 114 of the rack 116. The movement sensing can be understood with reference to light rays 22 and 22' in FIG. 3. Light ray 22 traverses a path of normal incidence to one of the gear teeth 114 and is reflected backwards along its original path from a normal end surface of the gear tooth 114. However, light ray 22' which is incident on a sloping sidewall of one of gear teeth 114 is reflected or scattered to another sloping sidewall of an adjacent gear tooth 114 since the sloping sidewalls of adjacent gear teeth 114 form a corner reflector. The reflected or scattered light ray 22' is thus collected by a second optical fiber 34 which is located adjacent to the first optical fiber 32 on one side thereof (e.g. juxtaposed with the first optical fiber 32, or located at an angle thereto). The light collected by the second optical fiber 34 can be detected with a detector 20 and converted into a detector output signal 24' which can be analyzed with a signal analyzer 26.

Linear motion of the rack 116 is thus be converted into a series of pulses of the reflected or scattered light which are converted into a detector output signal 24' and sensed by signal analyzer 26 to determine a rate of motion of the rack 116. By measuring the timing between pulses in the signal 24', the signal analyzer 26 can determine the uniformity of motion of rack 116. The timing information can also be used to determine the effect of torque or friction within the MEMS device 100 (e.g. by determining whether the timing between the reflected or scattered light pulses varies from one extent of movement of the rack 116 to the other extent of movement thereof). Additionally, by counting the detected light pulses, an extent or range of movement of the rack 116 can be determined. And, if an initial starting point of the rack 116 is known or can be determined from a reference feature, a final position of the rack 116 can be ascertained with the apparatus 10.

The provision of a third optical fiber 38 as shown in FIG. 3 can be used to determine a direction of movement of the rack 116. Such direction determination can be performed by observing the relative timing of detector output signals, 24 and 24', produced from light pulses collected by the second and third optical fibers, 34 and 38, in response to movement of the rack 116. This can be understood by initially considering the rack 116 as being in the position shown in FIG. 3 and moving, for example, to the right. With movement of the rack 116 to the right of its initial position, a first light pulse is collected by the second optical fiber 34 as light ray 22' is reflected or scattered from the sloping surfaces of adjacent gear teeth 114 in rack 116. This first light pulse produces a first electrical output pulse in detector output signal 24'. As the rack moves further to the right in FIG. 3, light ray 22' is reflected off the normal surface or face 118 of the gear tooth 114 back into the first optical fiber 32 so that no reflected or scattered light is collected by the second optical fiber 34, and no detector output signal 24' is produced. However, due to movement of the rack 114 to the right in FIG. 3, light ray 22 will intercept a sloping sidewall of one of the gear teeth 114 and be reflected or scattered in the direction of the third optical fiber 38, thereby producing a second light pulse which can be detected to produce a second electrical output pulse in detector output signal 24. A comparison of the relative timing or phase between the first and second electrical output pulses can then provide an indication of the direction of movement of rack 116. Furthermore, knowledge about the direction and extent of movement of rack 116 can be used to determine a mechanical state of the MEMS device 100 (e.g. whether the MEMS device 100 is in a first state defined by rack 116 being positioned entirely to the right, or in a second state defined by rack 116 being positioned entirely to the left).

The optical fibers (32, 34 and 38) in FIG. 3 can be precisely located on the MEMS device 100 by forming a series of grooves (not shown in FIG. 3) in the substrate 102 wherein the optical fibers are to be located. For a silicon substrate 102, preferential etching along crystalline planes can be used to form a plurality of parallel V-grooves for placement of the optical fibers (32, 34 and 38) during fabrication of the MEMS device 100; or by non-preferential etching a series of trenches at predetermined angles to each other for locating the optical fibers, 32, 34 and 38. In the case of a MEMS device 100 formed by LIGA processes on an alumina substrate 102, the grooves can be formed by laser scribing. The depth of the grooves or trenches can be predetermined to precisely locate the optical fibers in the vertical direction. The optical fibers (32, 34 and 38) can either be clamped in place and removed after analysis of the MEMS device 100 (e.g. for qualification testing); or the optical fibers can be attached to the substrate with an adhesive (e.g. for long-term life-testing of the MEMS device 100, or when a feedback loop is to be implemented for improving performance or operation of the MEMS device 100).

Although the third embodiment of the present invention has been described in terms of analyzing movement of a rack 116, it will be understood by those skilled in the art that the third embodiment of the present invention can be used to sense and analyze motion of any type of moveable member having a corrugated edge portion wherefrom light can be reflected or scattered. Additionally, the gear teeth 114 in rack 116 or any other type of moveable member can be shaped to increase the reflected or scattered light in a particular direction (e.g. when the second optical fiber 34 is angled with respect to the first optical fiber 32). Finally, although the third embodiment of the present invention has been described in terms of optical fibers for directing and collecting the light, the optical fibers can be replaced by optical waveguides deposited or formed on the substrate 102. Such optical waveguides, which are described hereinafter with reference to a fourth embodiment of the present invention, are advantageous for incorporating the apparatus 10 directly into a MEMS device 100 to form a compact and rugged unit.

Figure 4:
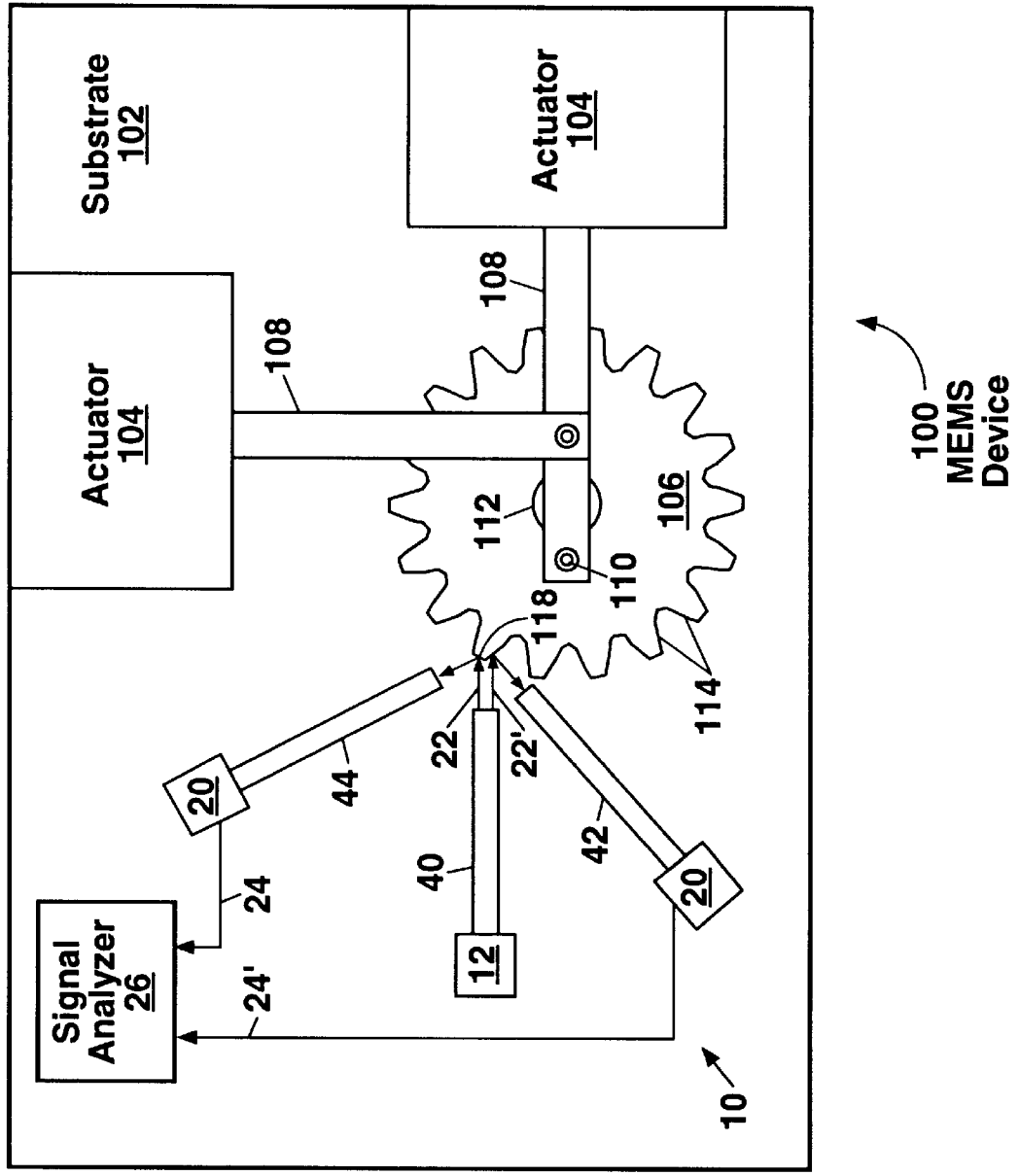
FIG. 4 shows a schematic representation of a fourth embodiment of the present invention.

FIG. 4 shows a fourth embodiment of the present invention. In FIG. 4, the apparatus 10 is formed on the same substrate 102 that contains the MEMS device 100. The apparatus 10 comprises a light source 12 powered by a supply (not shown) and coupled into one end of a first optical waveguide 40. The waveguide 40 in FIG. 4 is oriented to direct the light (shown as light rays 22 and 22') onto a corrugated portion (i.e. gear teeth 114) of a moveable member (i.e. gear 106). The reflected or scattered light is collected by second and third optical waveguides, 42 and 44 respectively, which convey the collected light to detectors 20. In FIG. 4, optical waveguide 44 is oriented adjacent to waveguide 40 and at an angle thereto so that light ray 22 is collected after being reflected or scattered off an outer surface or face 118 of a gear tooth 114, thereby generating detector output signal 24. Optical waveguide 42 in FIG. 4 is located on the opposite side of waveguide 40 and oriented at a predetermined angle so that light ray 22' is collected after being reflected or scattered off a sloping sidewall of the same gear tooth 114, thereby generating detector output signal 24'.

The optical waveguides 40–44 can be formed by lithographic patterning and lift-off of a dielectric material (e.g. a polymer or glass) on a surface of the substrate 102, or by deposition and etching methods known to the art. Although the optical waveguides 40–44 as linear waveguides, curved waveguides can be used as well.

In FIG. 4, the light source 12 can comprise a semiconductor laser or LED formed, for example, by epitaxial deposition on the surface of the substrate 102; or by epitaxial growth on another semiconductor substrate, with that semiconductor substrate being attached or wafer bonded to substrate 102 (e.g. as a hybrid circuit element). The detectors 20 can be formed similarly to the light source 12, or can be formed directly in a semiconductor substrate 102 (e.g. as a mesa structure formed on a silicon substrate 102 and selectively doped by ion implantation or diffusion to form a semiconductor p-n junction therein).

Signal analyzer 26 can comprise integrated circuitry comprising a plurality of interconnected transistors formed directly on the surface of the substrate 102 (e.g. as complementary metal-oxide-semiconductor transistors, also termed CMOS transistors, formed on a silicon substrate 102), or as an integrated circuit formed separately and attached to the substrate 102. Electrical connections between the detectors 20 and the signal analyzer 26 and for supplying power to the signal analyzer 26, detectors 20 and light source 12 can be formed as a patterned thin-film metallization. Electrical connections can optionally be provided between the signal analyzer 26 and the actuators 104 (or a signal source therefor) to complete a feedback loop for improving performance of the MEMS device 100 as described heretofore.

The functionality provided by the apparatus 10 for sensing or analyzing a performance characteristic of the MEMS device 100 has been described heretofore. An integrated apparatus 10, formed directly on the substrate 102, provides further advantages in terms of maintaining a precise and unchanging alignment with the moveable member (e.g. gear 106). Furthermore, the apparatus 10 provides an in-situ sensing capability for measuring one or more performance characteristics of the MEMS device 100 such as the direction, extent or uniformity of motion of one or more moveable members within the MEMS device 100, or information about a mechanical state of the MEMS device 100. Additionally, the apparatus 10 can be used to generate timing signals by sensing motion within the MEMS device 100.

Additional embodiments of the present invention will become evident to those skilled in the art based on the teachings of the present invention. For example, although the corrugated portion of the moveable member has been described herein as being in the form of gear teeth, the corrugated portion can comprise one or more reference features 50 recessed into a surface or edge of the moveable member, or protruding outward therefrom. FIGS. 5a–5d show examples of such reference features 50 formed in gears 106 for use with the apparatus 10.

In FIG. 5a, the reference feature 50 comprises a notch formed in one of the gear teeth 114. The notch can be formed during manufacture of the gear 106 and serves to alter the reflected or scattered light differently from the remaining gear teeth 114, thereby providing a reference position on gear 106 that can be used by the apparatus 10 for sensing motion of gear 106.

Figure 5B:
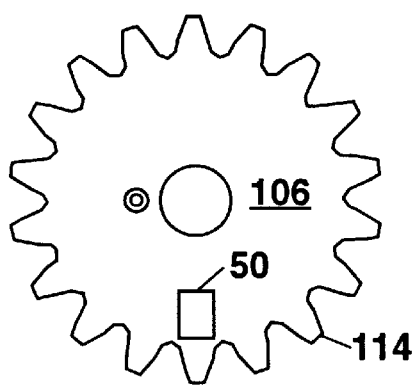

In FIG. 5b, the reference feature 50 comprises a shaped region recessed below an upper surface of gear 106, or protruding thereabove. The shaped region forming the reference feature 50 in FIG. 5b can be recessed into gear 106 as an well or trench (e.g. formed by etching), or can protrude outward from the upper surface of gear 106 as a mesa (e.g formed by deposition or plating). The shaped region can further be formed with a bottom surface (e.g. for a well) or a top surface (e.g. for a mesa) that is substantially parallel to the upper surface of gear 106, or tilted at an angle thereto (e.g. for reflecting or scattering the light in a particular direction that is substantially different from the angle of light reflected or scattered from the upper surface of gear 106).

Figure 5C:
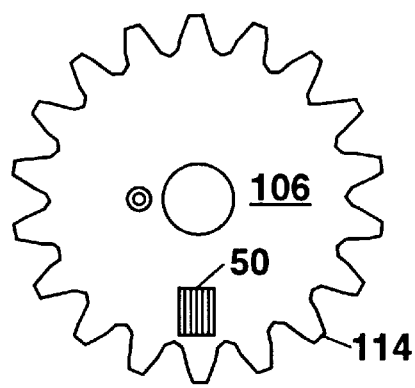

In FIG. 5c, the reference feature 50 comprises a plurality of grooves formed into the surface of gear 106 (e.g. forming a diffraction grating). In FIGS. 5a–5c, the reference features 50 provide a known reference position on gear 106 that can be used for measuring the movement of gear 106, or for easily identifying each rotation cycle of gear 106.

Figure 5D:
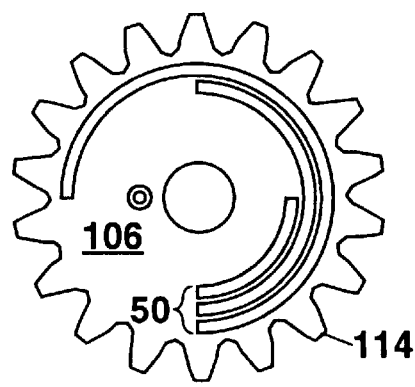

Additional reference features of the same or of different types can be provided on the moveable member (e.g. gear 106) at predetermined locations to improve measurement resolution (e.g. to form a vernier for improving measurement accuracy), or to indicate particular mechanical states of the MEMS device 100. In FIG. 5d, the reference feature 50 comprises a plurality of recessed concentric regions (e.g. concentric trenches) formed below the surface of gear 106, or a plurality of protruding concentric regions (e.g. concentric ridges) formed thereabove. As gear 106 rotates, the amount of light that can be reflected or scattered from the reference feature 50 in FIG. 5d will vary depending upon the number of concentric regions that the light intercepts. In some embodiments of the present invention, a separate apparatus 10 can be used to read out each concentric region.

By measuring the amount of reflected or scattered light, the angular position of gear 106 can be ascertained with an angular resolution that depends upon the number of concentric rings that are formed on the gear 106. The reference feature 50 in FIG. 5d thus forms an optical encoder for encoding positional information on the reflected or scattered light beam. Instead of a plurality of concentric regions, the optical position encoder in FIG. 5d can be formed by a single annular trench or mesa whose width varies with angular position around gear 106 to produce the same effect in altering the amount of reflected or scattered light with the angular position of gear 106.

Although the moveable member is shown in FIGS. 5a–5d as a gear 106, the reference features 50 can be applied to other types of moveable members in a MEMS device 100, including racks 116 and linkages 108 as shown in FIG. 3. In the case of a linkage 108, the reference feature 50 can form the corrugated portion for sensing motion of the linkage 108. Additionally, for elongate moving members such as rack 116 and linkage 108, an optical position encoder can be formed from a plurality of parallel trenches or ridges (or a single trench or ridge having a variable width) instead of the concentric regions shown in FIG. 5d. Finally, other types and variations of reference features 50 will become evident to those skilled in the art based on the teachings of the present invention.

Those skilled in the art will understand, based on the teachings of the present invention, that the accuracy of measuring movement of a moveable member within a MEMS device 100 can be increased by using a vernier measurement method whereby a plurality of reference features 50 are provided on the moveable member (e.g. gear 106) at predetermined locations (e.g. concentric locations) and angular spacings from each other so that the measurement of reflected or scattered light from each successive reference feature 50 will increase measurement accuracy for determining movement of the moveable member. Alternately, the vernier measurement method can be implemented by using a plurality of light beams 14 (from one or more apparatus 10) to intercept different locations on the moveable member (e.g. gear 106) in order to readout a single reference feature 50 with a high accuracy.

The matter set forth in the foregoing description and accompanying drawings is offered by way of illustration only and not as a limitation. Other applications and variations of the apparatus and method for sensing motion in microelectromechanical devices will become evident to those skilled in the art. The actual scope of the invention is intended to be defined in the following claims when viewed in their proper perspective based on the prior art.

What is claimed is:

1. Optical apparatus for sensing motion of a moveable member in a microelectromechanical system formed on a substrate, comprising:

(a) source means located proximate to the microelectromechanical system for generating light and directing the light to intercept a corrugated portion of the moveable member; and (b) detection means located proximate to the microelectromechanical system for detecting a portion of the light reflected or scattered from the corrugated portion of the moveable member, thereby sensing the motion of the moveable member within the microelectromechanical system.

2. The apparatus in claim 1 wherein the source means comprises a light source selected from the group consisting of lasers, light-emitting diodes and incandescent lamps.

3. The apparatus in claim 1 wherein the corrugated portion of the moveable member comprises gear teeth.

4. The apparatus in claim 1 wherein the light is focused by a lens to intercept the corrugated portion of the moveable member.

5. The apparatus in claim 4 wherein the detection means includes a second lens and an aperture thereby forming, in combination with the source means, a confocal optical system.

6. The apparatus in claim 2 wherein the source means further includes a first optical fiber for directing the light from the light source to intercept the corrugated portion of the moveable member.

7. The apparatus in claim 6 further including a lens located between the first optical fiber and the corrugated portion of the moveable member for focusing the light to a spot at the position of the corrugated portion of the moveable member.

8. The apparatus in claim 7 wherein the reflected or scattered light is collected by the first optical fiber and conveyed to the detection means.

9. The apparatus in claim 7 wherein the detection means includes a second optical fiber positioned proximate to the microelectromechanical system at an angle to the first optical fiber for collecting the reflected or scattered light for detection thereof.

10. The apparatus in claim 1 wherein the source means is located on the substrate, and comprises a light source and a first optical waveguide formed on the substrate with the first optical waveguide having a first end located proximate to the light source for receiving light therefrom, and a second end located proximate to the microelectromechanical system for directing the light thereto.

11. The apparatus in claim 10 wherein the detection means is located, at least in part, on the substrate, and comprises a light detector and a second optical waveguide, with the second optical waveguide being located adjacent to the first optical waveguide on one side thereof, with one end of the second optical waveguide being located proximate to the moveable member, and with the detector being located at the other end of the second optical waveguide.

12. The apparatus in claim 11 wherein the second optical waveguide is positioned at an angle to the first optical waveguide to facilitate the collection of the reflected or scattered light.

13. The apparatus in claim 11 wherein the detection means further comprises a third optical waveguide located adjacent to the first optical waveguide on a side thereof opposite from the second optical waveguide.

14. The apparatus in claim 1 wherein the moveable member comprises a gear.

15. The apparatus in claim 1 wherein the moveable member comprises a rack.

16. The apparatus in claim 1 wherein the moveable member comprises a linkage.

17. The apparatus in claim 1 wherein the corrugated portion of the moveable member is shaped to increase the reflected or scattered light in a particular direction.

18. The apparatus in claim 1 wherein the corrugated portion of the moveable member is shaped to form an optical encoder for encoding the information about the performance characteristic of the microelectromechanical system.

19. The apparatus in claim 1 wherein the corrugated portion of the moveable member is provided as a vernier on the moveable member to increase accuracy for sensing the motion thereof.

20. The apparatus in claim 1 wherein the corrugated portion of the moveable member comprises features recessed into a surface or edge of the moveable member.

21. The apparatus in claim 1 wherein the corrugated portion of the moveable member comprises features protruding from a surface or edge of the moveable member.

22. The apparatus in claim 1 wherein the microelectromechanical system includes a motor for driving the moveable member.

23. The apparatus in claim 1 wherein the detection means provides information about a performance characteristic of the microelectromechanical system selected from the group consisting of: information about a direction of movement of the moveable member; information about an extent of movement of the moveable member; information about a uniformity of motion of the moveable member; information about a mechanical state of the microelectromechanical system; information about spring and damping coefficients within the microelectromechanical system; information about torque and friction within the microelectromechanical system; and information about reliability of the microelectromechanical system.

24. The apparatus in claim 23 wherein the detection means further generates an electrical feedback signal from the information about the performance characteristic of the microelectromechanical system and provides the feedback signal to an input of the microelectromechanical system, thereby improving the performance characteristic of the microelectromechanical system.

25. An optical method for analyzing performance of a microelectromechanical system, comprising steps for:
(a) directing light from a source to intercept a corrugated portion of a moveable member of the microelectromechanical system, and reflecting or scattering a portion of the light from the corrugated portion of the moveable member; and
(b) detecting the reflected or scattered portion of the light, and recovering information therefrom about a performance characteristic of the microelectromechanical system.

26. The method of claim 25 wherein the moveable member is selected from the group consisting of gears, racks and linkages.

27. The method of claim 25 wherein the light source is selected from the group consisting of lasers, light-emitting diodes, and incandescent lamps.

28. The method of claim 25 wherein the corrugated portion of the moveable member comprises gear teeth.

29. The method of claim 25 wherein the corrugated portion of the moveable member comprises at least one feature formed on a surface or edge of the moveable member.

30. The method of claim 29 wherein the feature is formed recessed into the surface or edge of the moveable member.

31. The method of claim 29 wherein the feature is formed protruding outward from the surface or edge of the moveable member.

32. The method of claim 29 wherein the feature forms an optical encoder for encoding the information about the performance characteristic of the microelectromechanical system.

33. The method of claim 29 wherein a plurality of features are provided to form a vernier for measuring movement within the microelectromechanical system.

34. The method of claim 25 wherein the corrugated portion of the moveable member is shaped to increase the reflected or scattered light in a particular direction.

35. The method of claim 25 wherein the moveable member is driven by a motor.

36. The method of claim 25 wherein the step for directing the light to intercept the corrugated portion of the moveable member comprises focusing the light with a lens to a spot size smaller than the moveable member.

37. The method of claim 25 wherein the step for directing the incident light beam to intercept the moveable member comprises conveying the incident light through an optical fiber having one end thereof located proximate to the moveable member.

38. The method of claim 37 wherein the optical fiber is a single mode fiber.

39. The method of claim 25 wherein the step for directing the light to intercept the corrugated portion of the moveable member comprises conveying the incident light through a first optical waveguide formed on a substrate containing the microelectromechanical system, one end of the optical waveguide being located proximate to the moveable member.

40. The method of claim 39 wherein the step for detecting the reflected or scattered portion of the light comprises collecting the portion of the light with a second optical waveguide located adjacent to the first optical waveguide.

41. The method of claim 25 wherein the step of detecting the reflected or scattered portion of the light comprises detecting a forward-scattered portion of the light.

42. The method of claim 25 wherein the step of detecting the reflected or scattered portion of the light comprises detecting a back-scattered portion of the light.

43. The method of claim 25 wherein the information about the performance characteristic of the microelectromechanical system is selected from the group consisting of: information about a direction of movement of the moveable member; information about an extent of movement of the moveable member; information about a uniformity of motion of the moveable member; information about a mechanical state of the microelectromechanical system; information about spring and damping coefficients within the microelectromechanical system; and information about torque and friction within the microelectromechanical system.

44. The method of claim 25 further including a step for assessing the reliability of the microelectromechanical system using the information about the performance characteristic of the microelectromechanical system.

45. The method of claim 25 further including steps for generating an electrical feedback signal from the information about the performance characteristic of the microelectromechanical system and providing the electrical feedback signal to an input of the microelectromechanical system, thereby improving the performance characteristic of the microelectromechanical system.

46. The method of claim 25 wherein the step for detecting the reflected or scattered portion of the light comprises detecting a frequency shift in the reflected or scattered portion of the light.

47. The method of claim 25 wherein the step for detecting the reflected or scattered portion of the light comprises detecting a polarization characteristic of the reflected or scattered portion of the light.

48. The method of claim 25 wherein the step for detecting the reflected or scattered portion of the light comprises detecting a coherence characteristic of the reflected or scattered portion of the light.

49. A microelectromechanical device formed on a substrate, comprising:
(a) a gear formed on the substrate;
(b) at least one actuator formed on the substrate for imparting motion to the gear; and
(c) optical means formed, at least in part, on the substrate for sensing movement of teeth on the gear to recover positional information about the gear.

50. The microelectromechanical device of claim 49 wherein the actuator comprises an electrostatic actuator.

51. The microelectromechanical device of claim 49 wherein the actuator comprises an electromagnetic actuator.

52. The microelectromechanical device of claim 49 wherein the optical means comprises a source for generating light that is directed to intercept the gear teeth, and a detector for detecting a portion of the light beam reflected or scattered from the gear teeth.

53. The microelectromechanical device of claim 52 wherein optical means further comprises a first optical fiber for conveying the light from the source to intercept the gear teeth, and a second optical fiber adjacent to the first optical fiber for collecting the reflected or scattered light for detection thereof.

54. The microelectromechanical device of claim 52 wherein optical means further comprises a first optical waveguide formed on the substrate for conveying the light from the source to intercept the gear teeth, and a second optical waveguide adjacent to the first optical waveguide for collecting the reflected or scattered light for detection thereof.

55. The microelectromechanical device of claim 52 wherein the optical means further comprises a signal analyzer for receiving an electrical output signal from the detector and recovering positional information about the gear.

* * * * *